Feb. 15, 1949.   L. FLORA   2,461,974
ENCLOSURE FOR TRACTORS
Filed Sept. 18, 1945   2 Sheets-Sheet 1
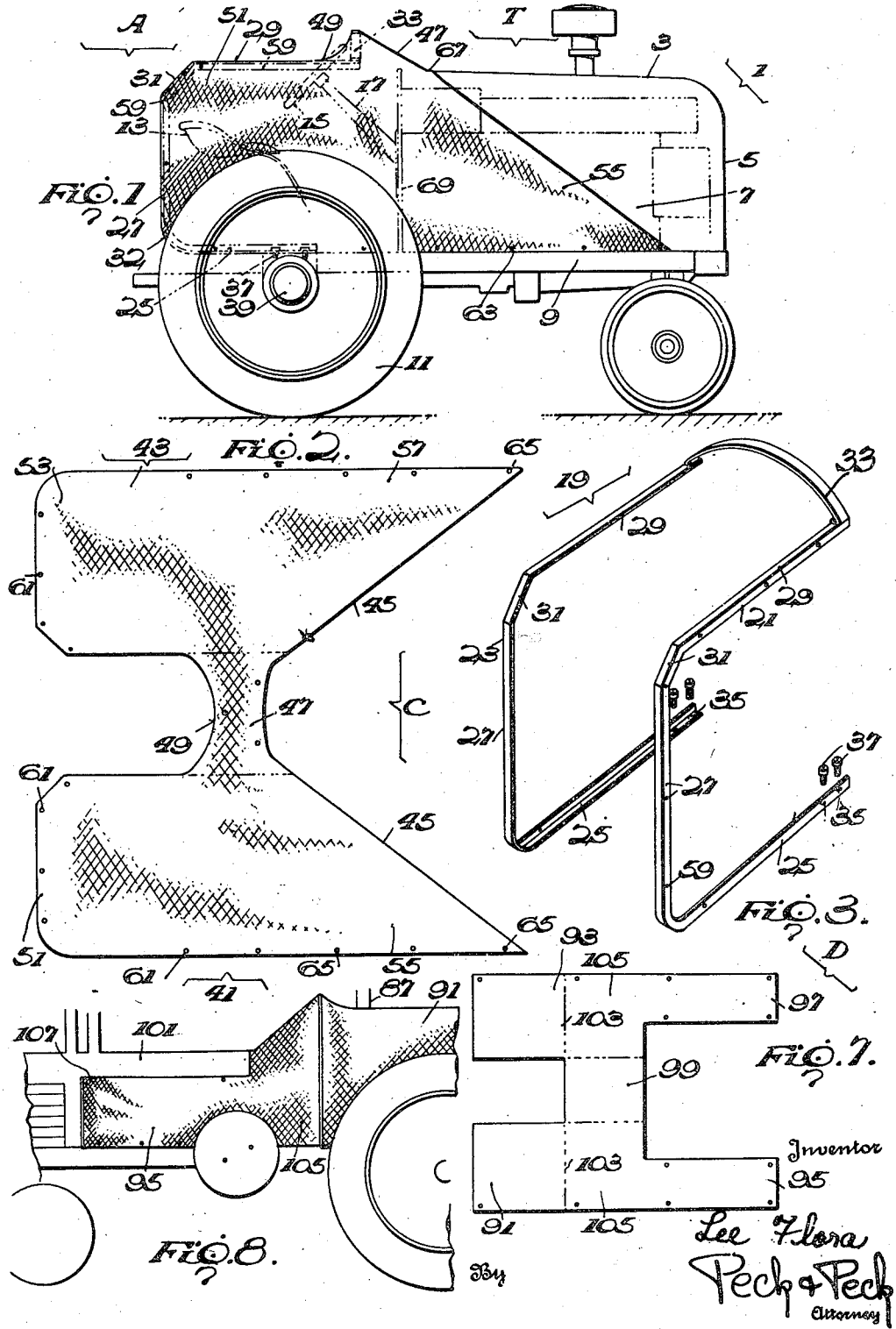
Inventor
Lee Flora
By Peck & Peck
Attorney

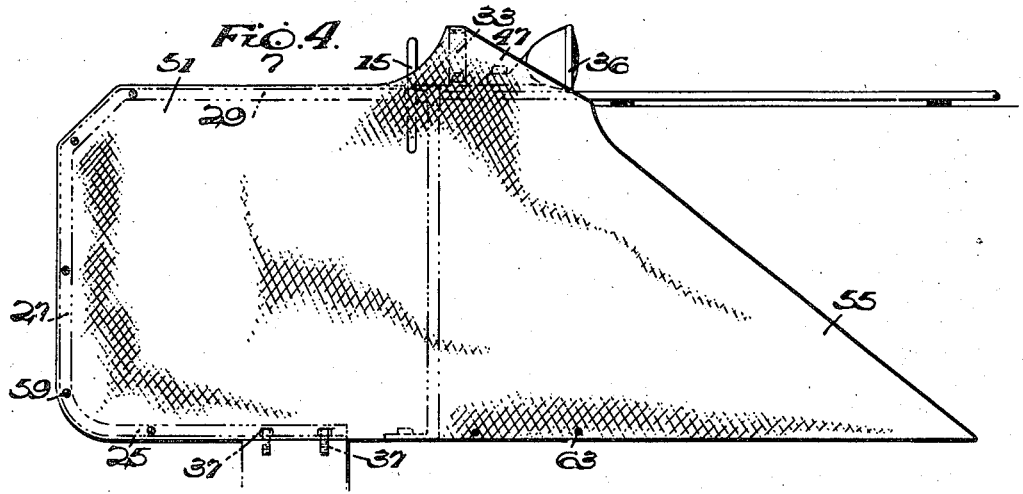
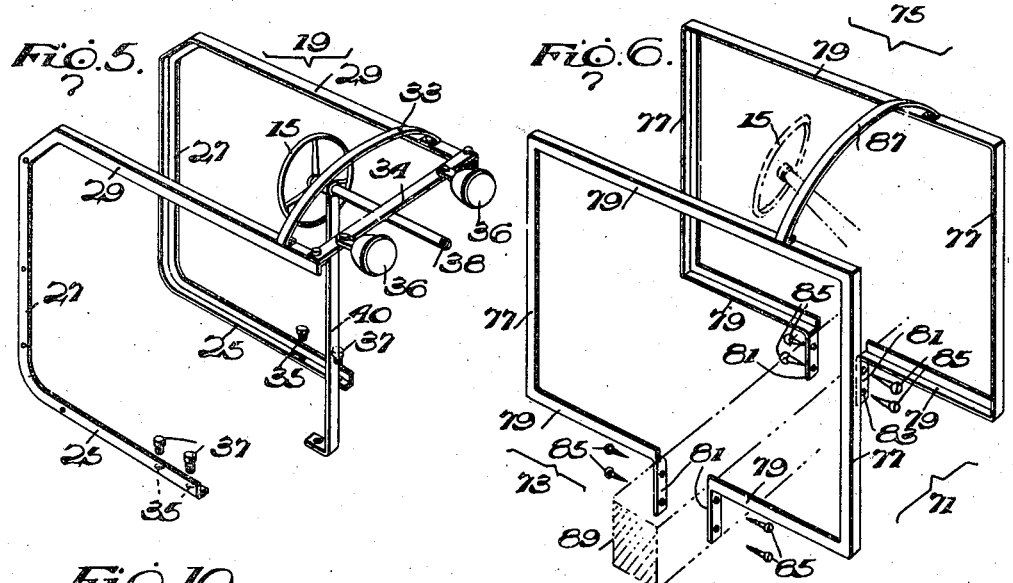
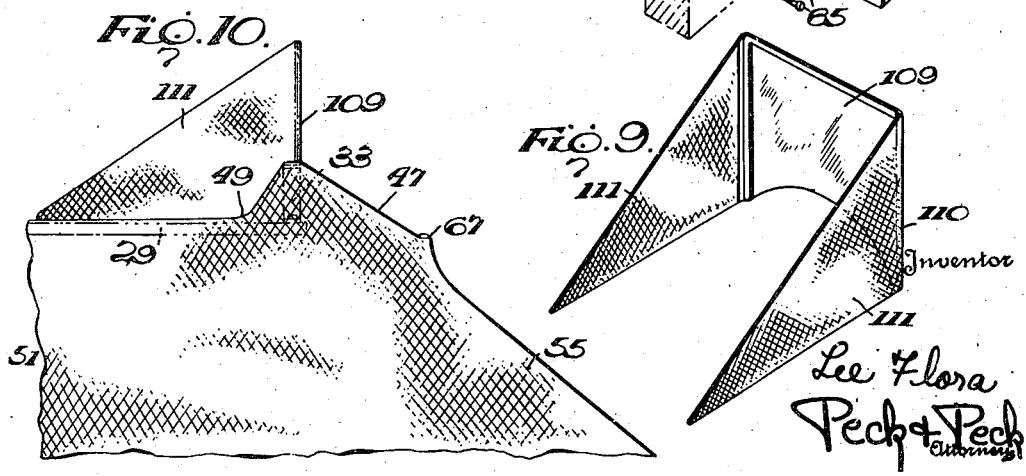

Patented Feb. 15, 1949

2,461,974

UNITED STATES PATENT OFFICE 2,461,974

ENCLOSURE FOR TRACTORS

Lee Flora, Danville, Ill.

Application September 18, 1945, Serial No. 617,049

14 Claims. (Cl. 180—54)

This invention relates broadly to the art of enclosures and heating means for vehicles and in its more specific aspects it relates to enclosures and heating means for the operators of agricultural and/or industrial tractors; and the nature and objects of the invention will be readily recognized and understood by those skilled in the arts to which it relates in the light of the following explanation and detailed description of the accompanying drawings illustrating what I at present believe to be the preferred embodiments and mechanical expressions of the invention from among various other forms, arrangements, combinations and constructions, of which the invention is capable within the spirit and scope thereof.

The customary tractor which is used for agricultural, industrial or the like purposes, is usually provided with a seat for the operator, which seat is disposed to the rear of the engine of the tractor, the tractor control and operating elements being disposed adjacent such seat within reach of the hands and feet of the operator. In some instances tractors may be provided with a platform to the rear of the engine, the operator either standing on such platform or sitting on a seat supported thereon. Whether a platform is provided, or whether a seat for the operator is merely mounted on the tractor chassis, the operator is usually entirely exposed to the elements, there being no operator protecting means provided on the tractor.

In using such tractors having no operator protecting means, it will be apparent that the outdoor use of such tractors during the winter months in many regions subjects the operator to considerable hardships and undoubtedly detracts from the output or productive use of such tractors, as well as effecting the efficiency of the driver.

I have devised an arrangement for tractors by means of which many of the aforementioned operator hardships are overcome, and the tractor may be used during the winter months with relatively small discomfort to the operator thereof.

It is, therefore, a primary object of my invention to provide an enclosure for the operators of tractors.

Another object of my invention is to provide an enclosure for the operators of tractors which serves the dual purpose of protecting a major portion of the operator's body from the elements, and also serves to convey and direct heat from the engine of the tractor toward the operator.

It is also an object of my invention to provide a combined protective and heat conveying and directing enclosure which is removably mounted on a tractor so that it may be removed therefrom during the warm months of the year.

A still further object of my invention is to provide a tractor enclosure and heat conveying and directing means which may be removably mounted on a tractor without requiring any substantial changes in the tractor.

And yet another object of my invention is to provide a tractor enclosure and heat conveying and directing means which is so designed that it may be mounted on and attached to various types of tractors with great facility.

Another object of my invention is to provide a tractor enclosure and heat directing and conveying means of various forms, all embodying the same general structural principles so that such enclosures may be mounted on a number of different types or makes of tractors.

A further object of my invention is to provide a tractor enclosure and heat conveying and directing means which may be mounted on a tractor without requiring complex equipment and tools, and without requiring the services of a skilled mechanic.

It is also an object of my invention to provide a tractor enclosure and heat conveying and directing means which, when mounted on a tractor, does not obstruct in any way the operator's ingress and egress to the operating section of the tractor.

An additional object of my invention is to provide a tractor enclosure and heat conveying and directing means which allows the operator of the tractor to have clear, unobstructed vision of the surrounding area and also permits of free action by the operator in driving the tractor.

A further object of my invention is to provide a tractor enclosure and heat conveying and directing means which is of a sturdy construction to thereby withstand the relatively hard usage to which tractors are usually subjected.

And yet another object of my invention is to provide such a tractor enclosure and heat conveying and directing means which is economical to manufacture and is composed of relatively few parts so that the assembly thereof may be accomplished with facility.

With the foregoing general objects, features and results in view, as well as certain others which will be apparent from the following explanation, the invention consists in certain novel features and designs, construction, mounting and combination of elements, as will be more fully and particularly referred to and specified hereinafter.

Referring to the accompanying drawings:

Fig. 1 of the drawings is a view in side elevation of a tractor with the tractor enclosure and heat conveying and directing means mounted thereon.

Fig. 2 of the drawings is a plan view of the fabric or the like material forming the protective covering, and the heat conveying and directing means.

Fig. 3 of the drawings is a view in perspective of the supporting framework for the fabric or the like protecting and heat conveying and directing means.

Fig. 4 of the drawings is a view in side elevation with parts thereof broken away, of a type of tractor having a horizontally disposed steering column, the tractor having a further form of my tractor enclosure and heat conveying and directing means mounted thereon.

Fig. 5 of the drawings is a view in perspective of the form of framework for supporting the fabric or the like protective covering, such framework being illustrated as mounted on the tractor shown in Fig. 4 of the drawings.

Fig. 6 of the drawings is a view in perspective of another type of framework for supporting the fabric or the like protecting and heat conveying and directing covering, which framework is to be used on certain makes of tractors.

Fig. 7 of the drawings is a plan view on a reduced scale relative to Fig. 2 of the drawings, of a modified form of fabric or the like protective and heat conveying and directing covering which I propose using on certain makes of tractors, and is designed for use with the supporting framework illustrated in Fig. 6 of the drawings.

Fig. 8 of the drawings is a view in side elevation of a tractor with parts thereof broken away illustrating the fabric of Fig. 7 of the drawings mounted on the supporting framework of Fig. 6 of the drawings, all of which are mounted in operative position on the tractor of this figure of the drawings.

Fig. 9 of the drawings is a view in perspective of a windshield for combination with the tractor enclosure and heat conveying and directing means, and is especially useful in protecting the tractor operator's face from the elements.

Fig. 10 of the drawings is a view in side elevation with parts thereof broken away of the windshield of Fig. 9 of the drawings mounted on the fabric or the like supporting framework which in turn is mounted in operative position on a tractor.

I have found that the operators of tractors of any type which may be used in the outdoors during the cold months or during the spring and fall months of the year, or which may be used indoors in unheated buildings or the like, are subjected to great hardships due to the weather, which hardships make it necessary for such tractor operators to stop operating the tractor at frequent intervals in order to warm themselves, and it is, therefore, obvious that productive man-hours are thereby lost. I have, by this invention, devised a simple, efficient and economical structure whereby the operator is, to a great degree, protected from winds. My invention serves to protect the operator of the tractor from winds and at the same time it functions to convey and direct a current of warm air from the engine of the vehicle toward the operator and the protected area he is in. It is particularly advantageous due to the fact that it may be mounted on and combined with a tractor without necessitating a redesigning or a structural alteration of the tractor. Hence, it may be used with advantage on the smallest farm where little or no equipment or mechanical ability is available, and it will, of course, serve its purpose in all types of operations using tractors.

I desire to define the term "tractor" as herein used in describing and claiming my invention. Wherever I use the term "tractor" in this description, I intend to include any vehicle normally having a generally open area where the operator sits or stands which area is located in a direction generally rearwardly of the tractor engine.

Referring to the accompanying drawings, and particularly to Fig. 1 thereof, wherein I have disclosed one form of my invention mounted in operative position on a tractor which I shall designate generally by the letter T, I have used the numeral 1 to designate the usual internal combustion or the like engine which powers the tractor and which is mounted within a hood 3 which is disposed above the engine and is provided with the usual radiator 5. It is not generally customary in tractors to enclose the sides of the engine, and the engine disclosed in the tractor illustrated in Fig. 1 of the drawings is exposed at its sides as shown at 7, the hood being of such construction that it is not provided with solid vertical side walls. While I have particularly disclosed in Fig. 1 of the drawings a tractor having an engine covering hood which is open at the sides, it is not necessary that the engine be completely exposed at its sides as illustrated in Fig. 1 of the drawings, for my invention will properly function and serve its useful, advantageous purposes on a tractor which provides an engine covering at the sides as well as the top and is only provided with louvres or the like at the vertical sides thereof. In other words, my invention will properly function with any tractor which has an enclosed engine provided some sort of engine heat dissipating means are provided at the sides thereof. Thus, I have used the particular type of tractor disclosed in Fig. 1 of the drawings merely as an example from among many types of tractors, to all of which my enclosure and heat conveying and directing means may be combined with successful results.

In the particular embodiment of tractor disclosed in Fig. 1 of the drawings, I have shown one longitudinal rail or frame member 9 of the chassis of the tractor. There are, of course, two of such longitudinal frame members in the conventional tractor chassis.

Disposed rearwardly of the engine 1, and between the rear wheels 11 of the tractor is what I shall term the operating area of the tractor which I have designated generally by the letter A. Disposed within the operating area and supported on the tractor in any convenient manner, I may provide a seat 13 for the operator of the tractor, and the usual steering wheel 15 and steering column 17 project rearwardly from the engine enclosure into this operating area A. Consideration of the drawings makes it apparent that the operator of the tractor 1, seated upon the seat 13 within the operating area of the tractor, is customarily entirely exposed to the elements and thus operates the tractor under considerable handicaps. In order to overcome the effects of the elements and to provide a protecting medium for the operating area and to utilize the heat of the engine, I have provided a framework which is particularly disclosed in Fig. 3 of the drawings and which I shall designate in its entirety by the numeral 19.

Such framework 19 is composed of two sections 21 and 23 of generally U shape which sections are preferably, though not necessarily formed of metallic angle iron having sufficient rigidity to withstand the strains to which the framework will be subjected in actual use. Each U-shaped section 21 and 23 is composed of a length of metallic angle iron or the like bent to provide horizontal base members 25 and vertical uprights 27, and top horizontal members 29 which are in substantially the same vertical plane as the base members 25. It will be noted that the vertical members 27 are angled at their uppermost portions as at 31 to provide inclined corner portions between the uprights and the top horizontal members, and the juncture of the base members and uprights is curved as at 32. In shaping the frame sections 21 and 23, I form the base members 25 shorter than the top horizontal members 29, for a purpose which will hereinafter be made clear. The two sections 21 and 23 are joined together by means of a metallic yoke or bridging member 33 which is secured to the forward or free ends of the top horizontal members 29 in any convenient manner to extend thereacross, all as particularly shown in Fig. 3 of the drawings. Adjacent to but spaced from the forward or free ends of the base members 25 are holes 35 drilled to receive therethrough bolts 37 whereby the framework 19 may be attached in operative position on the tractor.

Most tractors are provided with axle housings which are drilled and tapped for various purposes, thus, to mount the framework 19 on the tractor T, the holes being drilled and tapped in the axle housing of the tractor, the framework is disposed with the open ends of each section 21 and 23 and the yoke member 33 in forwardly disposed position, and with the holes 35 in the base members 25 positioned over the holes which have been drilled and tapped in the axle housing 39. The bolts 37 are then disposed through the holes 35 in the base members and screwed into the holes in the axle housing. The framework 19 is thereby attached to and mounted on the tractor in operative position, defining the transverse confines of the operating area A and providing in effect a cab or cage within which the operator of the tractor may stand or sit. With the framework 19 operatively mounted on the tractor, it will be apparent, particularly from examination of Fig. 1 of the drawings, that the yoke member 33 will be disposed forwardly of the steering wheel 15 and at its highest point will be above the highest point of the steering wheel. It will be also understood that the forward ends of members 29 will be spaced from the rear part of the engine or engine housing of the tractor. Thus, the framework 19 may be used with different types of tractors even though the distance from the axle housing to the rear part of the engine or engine housing might vary.

I provide a covering which is adapted to be supported on the framework 19 and on certain parts of the tractor, and this covering is illustrated particularly in Fig. 2 of the drawings. The covering, which I shall designate generally by the letter C, may be made of any desirable fabric material which is preferably flame-proofed and fire resistant as well as being water-resistant and/or water repellant and of a weave or body content to withstand the usage to which it will be subjected. I have found that canvas is suitable for this purpose, although I do not wish to limit my invention to canvas for many fabrics may be successfully used. By using a flame-proofed and fire resistant fabric, the fabric will not be damaged regardless of the heat of the engine. Any well known flame proofing process may be used for treating the fabric.

While I preferably utilize a flexible fabric covering, a rigid material may be used and still fall within the spirit and scope of my invention. It is the covering C which in operative position provides vertical side protective panels for the operating area and also provides means for conveying and directing heat from the engine to the operating area of the tractor.

The fabric covering C is cut or otherwise formed to provide two spaced panel sections 41 and 43 having the forward portions thereof forwardly diverging as at 45. The panel sections 41 and 43 are connected intermediate the ends thereof by means of a section of fabric 47 of substantial width forwardly and rearwardly and having the rear edge thereof forwardly curved as at 49. The section of fabric 47 in operative position provides a cowl connecting the two spaced panel sections and in length is substantially the same as the distance the sections 21 and 23 of the metallic framework 19 are spaced apart. The spaced panel sections 41 and 43 when disposed in operative position on a tractor provide vertical protective panels 51 and 53 which are constituted generally by the portions of the panels 41 and 43 which extend rearwardly of the cowl 47, and the spaced panel sections 41 and 43 additionally provide, when disposed in operative position on a tractor forwardly projecting heat conveying and directing flaps 55 and 57 which are constituted generally by the portions of panels 41 and 43 which extend forwardly of cowl 47.

When the framework 19 is attached in operative position on a tractor the protective and heat conveying and directing covering C may then be disposed in operative position thereon.

The vertical side panels 51 and 53 are placed against the exterior of the frame sections 21 and 23 and are removably attached thereto in any convenient manner, such as by snap hooks 59 on the frame sections and complementary holes 61 which may be provided in the fabric panels. With the vertical side panels in position on the framework, it will be evident that the forwardly projecting heat conveying and directing flaps 55 and 57 will extend forwardly adjacent each side of the engine of the tractor. The forwardly projecting flaps may be removably attached in position in any convenient manner such as by snap hooks 63 mounted on rails 9 and complementary holes 65 in the fabric.

It will be recognized from consideration of Fig. 1 of the drawings that the cowl forming section 47 of the fabric C will extend from the top of the hood 3 adjacent the rear end thereof to and over the yoke 33 of the metallic framework 19 to thereby provide a front protection for the operator's hands while supporting the cowl so as not to interfere with the manipulation of the steering wheel by the operator. By the particular curved formation 49 it will be seen that I have provided a substantial degree of side protection for the operator's hands; this is clearly illustrated in Fig. 1 of the drawings. The cowl section 47, while providing front and side protection for the operator's hands, also covers the space between the forward ends of the top horizontal members 29 of the framework and the rear panel 69 of the engine. The forward edge of the cowl is preferably removably attached to the hood of the tractor in any convenient and desirable manner as shown at 67.

When a tractor is equipped with my enclosure and heat conveying and directing means, it will be apparent that the operating area is afforded great protection by the vertically disposed fabric panels 51 and 53, and it will also be apparent that heat from the tractor engine will be conveyed and directed into the operating area by means of the forwardly projecting flaps 55 and 57. Such flaps extend forwardly on each side of the engine and receive heat therefrom through the open sides 7 of the engine hood and convey and direct such heat rearwardly therefrom into the operating area A of the tractor. It is to be understood that the width of the operating area as defined by the frame sections 21 and 23 is slightly greater than the width of the engine housing to thereby permit the hot air to flow between the fabric C and the rear engine partition or the like member 69.

By the particular construction and mounting of heat conveying flaps 55 and 57, the operator of the tractor may regulate the amount of heat conveyed and directed into the operating area. For instance, in the event the amount of heat being conveyed is too great, the flaps may be folded back by unsnapping one or more of the forward snaps 63 and hooking the forward ends of the flaps on the rearmost snap 63. When this is done, it will be evident that less hot air will be directed into the operating area, as a portion of the engine heat will be dissipated into the surrounding atmosphere.

In Figs. 4 and 5 of the drawings, I have illustrated a modified form of framework which has been specifically devised for use on certain types or makes of tractors which provide a horizontally disposed steering column, and with this form of my invention I have incorporated a set of headlights.

Referring particularly to Figs. 4 and 5 of the drawings wherein the same reference numerals hereinbefore used are again used to designate similar parts, it will be evident that the same fabric covering C is again used. However, in this type of my invention, the yoke or bridging member 33 of the framework 19 is mounted on the top horizontal members 29 at a point spaced from the ends of said members, and I provide a cross bar 34 on the ends of said members to extend across the metallic framework and I mount a pair of headlights 36 on the cross bar. The tractor with which this form of framework 19 is adapted to be used is provided with a substantially horizontal steering column 38, the steering assembly being supported by means of a metallic upright 40 which is attached to a part of the chassis of the tractor. Thus, in this form of my invention the framework 19 serves to support the covering C, and the enclosure formed by the framework and the covering, and the forwardly projecting flaps which convey and direct the engine heat all function in the same manner and on the same principles as does the arrangement described in connection with the disclosures of Figs. 1, 2 and 3 of the drawings.

In Figs. 6, 7 and 8, I have illustrated another form of my invention which may be used with facility on certain types of tractors which may be characterized by a design wherein the width of the engine and its housing are substantially less than the width of the operating area. The Case tractor is one example of this type.

Referring particularly to Fig. 6 of the drawings, wherein I have used the numeral 71 to designate the covering supporting framework in its entirety, such framework comprises two substantially rectangular frame sections 73 and 75 which are preferably constructed of lengths of metallic angle iron bent to the required shape. Each frame section 73 and 75 comprises two vertical legs 77 and a top horizontal leg 79, the frame sections 73 and 75 in operating position being spaced apart a distance substantially equal to the width of the operating area of the tractor to which the framework is applied. The ends of the lengths of metallic angle iron or the like from which each frame section is made are bent to form spaced lower horizontal members 79, the free ends being downwardly bent to form depending supporting legs 81 having holes 83 drilled therein for receiving bolts 85.

A yoke 87 of the same type as those hereinbefore described is secured on the upper horizontal members 79 and bridges them. Such yoke is spaced from the ends of members 79 and is disposed thereon in proper position relative to the steering wheel 15 of the tractor when the framework is mounted and attached thereon.

The axle housing of this type of tractor is illustrated at 89, and the housing is drilled and tapped to receive the bolts 85 which extend through holes 83 which are provided in the depending members 81 of the framework. In this manner the framework is mounted on and removably attached to the tractor, the depending framework 81 being attached to opposite vertical walls of the axle housing.

In the form of my invention illustrated in Figs. 6, 7 and 8, I use a fabric or the like covering which is cut differently from the covering C which has been hereinbefore described. The fabric or the like covering which I shall now describe is designated generally by the letter D and is particularly disclosed in Fig. 7 of the drawings, and it is to be distinctly understood that the covering D is especially designed for use with the supporting framework 75 of Fig. 6 of the drawings.

The fabric covering D is cut or otherwise formed to provide two operating area side and front protective panels 91 and 93 and two forwardly projecting heat conveying and directing flaps 95 and 97 of generally rectangular outline and of reduced width relative to the protective panels 91 and 93, the flaps forming a continuation or extension of the panels, and preferably though not necessarily being formed integral therewith. A cowl member 99 connects the two panel and flap sections in such manner that the panel sections are spaced apart an amount substantially the equivalent of the width of the operating area of the tractor.

In Fig. 8 of the drawings, I have illustrated the tractor enclosure and heat conveying and directing means of Figs. 6, 7 and 8 mounted on framework 75 on a tractor of the type discussed, wherein the width of the engine and engine housing 101 is less than the width of the tractor operating area. It will thus be understood that in this type of tractor there is a forward area between the rear of the engine and the outer sides of the tractor operating area which must be protected if winds, rain and snow are to be kept from the operating area. I have provided for the closing of this space by the covering D by making the panels 91 and 93 of greater length than the fore and aft length of the operating area. Thus those portions of panels 91 and 93 which lie substantially within the dotted lines 103 of Fig. 7 of the drawings and which are designated by the numeral 105 are actually front protective panels which are generally diagonally disposed relative to the fore and aft line of the tractor as particularly shown in Fig. 8 of the drawings.

The covering D is removably fastened to the supporting framework and the hood in any convenient manner as by snap hooks or the like 107.

This form of my invention functions in the same manner as that illustrated in Figs. 1, 2 and 3 of the drawings, the side panels 91 and 93, and the front panels 105 serving to protect the operator from the elements and the flaps 95 and 97 functioning to convey and direct heat from the engine to the operating area.

Figs. 9 and 10 of the drawings illustrate one form of windshield which I may combine with the enclosure and heat directing and conveying means to protect the head and face of the operator. One example of such shield which may be used provides a front section 109 having an upwardly curved lower edge 110 and side sections 111, and this windshield is preferably made of any suitable transparent plastic materials. I preferably mount the shield in front of the yoke 33 and it may be secured to the forward edges thereof and to the forward ends of the horizontal top members 29. By providing the forward shield 109 with the upwardly curved lower edge 110, it will be evident that the flexible protective covering, and particularly the cowl 47 thereof, may pass through the windshield 109 below the curved surface thereof. It will be recognized that the addition of this windshield to my enclosure and heat conveying and directing means adds greatly to the protective attributes of my invention.

I claim:

1. A housing attachment for a tractor having a forwardly arranged engine hood and a rearwardly arranged operator's seat, adapted to convey heat from the tractor engine for discharge about said seat comprising, a supporting frame structure integrally formed with a substantially horizontal U-shape section having the base portion thereof located above the line of the engine hood at a position forwardly of said seat and its legs extended rearwardly to both sides of said seat, downwardly projected extensions at the rear ends of said legs, means for attaching the lower ends of said extensions to opposite sides of said tractor, a flexible housing member having a pair of side sections and a cowl section attached to said supporting frame, and of a construction such that said side sections are arranged at opposite sides of said hood and said cowl section is inclined forwardly and downwardly between said side sections, and means for holding the lower sides of said side sections and the front ends of said side sections and cowl section against the tractor.

2. An enclosure for a tractor having an engine mounted in the forward portion thereof, an operating area for the operator of the tractor positioned rearwardly of the engine, and a framework removably mounted on the tractor, said framework comprising a pair of forms each of generally U-shape, one of which projects upwardly at one side of the operating area and the other of which projects upwardly at the opposite side of the operating area, one of said forms extending forwardly along each side of the operating area from substantially the rear thereof toward but spaced from the front thereof, and the forms being so mounted on the tractor that the parallel legs of each form are substantially vertically aligned and the free ends of said legs are forwardly directed toward the engine of the tractor but spaced therefrom, an upwardly curved yoke extending between and connecting the uppermost leg of one form with the uppermost leg of the other form adjacent the forward ends thereof, and an operating area protective covering mounted on said forms and extending over said yoke, providing side protection for the operating area and providing a covering for the space between the free ends of the uppermost legs of the forms and the engine of the tractor.

3. An enclosure for a tractor having a forwardly arranged hood having open sides and an engine for the tractor mounted within the hood, an operating area for the operator of the tractor positioned rearwardly of the engine, means for protecting the operating area of the tractor against side winds and for conveying and directing heat from the engine into the operating area including a framework mounted on the tractor comprising a pair of forms each of generally U-shape, one of which projects upwardly at one side of the operating area and the other of which projects upwardly at the opposite side of the operating area, one of said forms extending forwardly along each side of the operating area from substantially the rear thereof toward but spaced from the front thereof, and the forms being so mounted on the tractor that the parallel legs of each form are substantially vertically aligned and the free ends of said legs and forwardly directed toward the engine of the tractor but spaced therefrom, an upwardly curved yoke bridging and connecting the uppermost leg of one form with the uppermost leg of the other form adjacent to forward ends thereof, and an operating area protective covering mounted on said forms and extending over said yoke and forwardly extended to project along both sides of the engine and attached to the tractor adjacent the sides of the engine.

4. An enclosure for a tractor having an engine mounted in the forward portion thereof, an operating area for the operator of the tractor positioned rearwardly of the engine, a tractor steering member projecting into the operating area and a framework removably mounted on the tractor, said framework comprising a pair of forms each of generally U-shape, one of which projects upwardly at one side of the operating area and the other of which projects upwardly at the opposite side of the operating area and said forms being so mounted on the tractor that the parallel legs of each form are in substantially vertical alignment, and one of said forms extends along each side of the operating area from substantially the rear thereof to points forwardly of said tractor steering member, and an operating area protective covering mounted on said forms providing side protection for the operating area.

5. An enclosure for a tractor having an engine mounted in the forward portion thereof, an operating area for the operator of the tractor positioned rearwardly of the engine, a tractor steering member projecting into the operating area, and a framework removably mounted on the tractor, said framework comprising a pair of forms each of generally U-shape, one of which projects upwardly at one side of the operating area and the other of which projects upwardly at the opposite side of the operating area, each of said forms extending from substantially the rear of the operating area to points forwardly of said tractor steering member, and the forms being so mounted on the tractor that the parallel legs of each form are substantially vertically aligned and the free ends of said legs are forwardly directed toward the engine, and an operating area protective covering mounted on said forms providing side protection for the operating area.

6. An enclosure for a tractor having an engine mounted in the forward portion thereof, an operating area for the operator of the tractor positioned rearwardly of the engine, a tractor steering member projecting into the operating area and a framework removably mounted on the tractor, said framework comprising a pair of forms each of generally U-shape one of which projects upwardly at one side of the operating area and the other of which projects upwardly at the opposite side of the operating area, one of said forms extending along each side of the operating area from substantially the rear thereof to points forwardly of said tractor steering member, and an operating area protective covering mounted on said forms providing side protection for the operating area.

7. An enclosure for a tractor having an engine mounted in the forward portion thereof, an operating area for the operator of the tractor positioned rearwardly of the engine, and a framework removably mounted on the tractor, said framework comprising a pair of forms each of generally U-shape, one of which projects upwardly at one side of the operating area and the other of which projects upwardly at the opposite side of the operating area, one of said forms extending forwardly along each side of the operating area from substantially the rear thereof toward but spaced from the front thereof, and the forms being so mounted on the tractor that the parallel legs of each form are substantially vertically aligned and the free ends of said legs are forwardly directed toward the engine of the tractor but spaced therefrom, an upwardly curved yoke extending between and connecting the uppermost leg of one form with the uppermost leg of the other form adjacent to but spaced from the forward ends thereof, a cross bar connecting the forward ends of the uppermost legs of the forms providing a support for headlights, and an operating area protective covering mounted on said forms providing side protection for the operating area, and extending over said yoke.

8. A housing attachment for a tractor having a forwardly arranged engine hood and a rearwardly arranged operator's seat, adapted to convey heat from the tractor engine for discharge about said seat comprising, a supporting frame structure with a substantially horizontal U-shape section having the base portion thereof located above the line of the engine hood at a position forwardly of said seat and its legs extended rearwardly to both sides of said seat, downwardly projected extensions at the rear ends of said legs, means for attaching the lower ends of said extensions to opposite sides of said tractor, a flexible housing member having a pair of side sections and a cowl section attached to said supporting frame, and of a construction such that said side sections are arranged at opposite sides of said hood and said cowl section is supported from the base portion of said supporting frame structure, and means for holding the lower sides of said side sections and the front ends of said side sections and cowl section against the tractor.

9. A housing attachment for a tractor having a forwardly arranged engine hood and a rearwardly arranged operator's seat, adapted to convey heat from the tractor engine for discharge about said seat comprising a supporting frame structure with a substantially horizontal U-shape section having the base portion thereof located above the line of the engine hood at a position forwardly of said seat and its legs extended rearwardly to both sides of said seat, downwardly projected extensions at the rear ends of said legs and forwardly projected parallel members at the lower ends of said extensions, said members attached to opposite sides of the tractor at points spaced forwardly of said extensions, a flexible housing member having a pair of side sections and a cowl section attached to said supporting frame, and of a construction such that said side sections are arranged at opposite sides of said hood and said cowl section is inclined forwardly and downwardly between said side sections, and means for holding the lower sides of said side sections and cowl section against the tractor.

10. An enclosure for a tractor having a forwardly arranged hood having open sides and an engine for the tractor mounted within the hood, an operating area for the operator of the tractor positioned rearwardly of the engine, means for protecting the operating area of the tractor against side winds and for conveying and directing heat from the engine into the operating area including a framework mounted on the tractor comprising a pair of forms each of generally U-shape, one of which projects upwardly at one side of the operating area and the other of which projects upwardly at the opposite side of the operating area, one of said forms extending forwardly along each side of the operating area from substantially the rear thereof toward but spaced from the front thereof, and the forms being so mounted on the tractor that the parallel legs of each form are substantially vertically aligned and the free ends of said legs are forwardly directed toward the engine of the tractor but spaced therefrom, an upwardly curved yoke bridging and connecting the uppermost leg of one form with the uppermost leg of the other form adjacent the forward ends thereof, and a flexible housing member having a pair of side sections mounted on said forms, and a cowl section attached to and supported by said yoke, said housing member being of such construction that the side sections extend forwardly from said frames along opposite sides of said hood and means for holding the lower sides of said forwardly extending side sections and the front ends of said forwardly extending side sections and said cowl section against the tractor.

11. An enclosure for a tractor having an engine mounted in the forward portion thereof, an operating area for the operator of the tractor positioned rearwardly of the engine and means for protecting the operating area of the tractor against side winds, including a framework mounted on the tractor, said framework comprising a pair of forms one of which projects upwardly at one side of the operating area and the other of which projects upwardly at the opposite side of the operating area, each of said forms extending from substantially the rear of the operating area to substantially the front thereof, an upwardly curved yoke bridging and connecting the forms adjacent the forward ends thereof, and an operating area protective covering mounted on said forms and extending over said yoke, the section of the covering which extends over the yoke having a curved rear edge providing a rearwardly and downwardly extending curved portion of the protective covering between the yoke and the forms.

12. An enclosure for a tractor having an engine and an operating area rearwardly arranged relative to the engine, a steering member for the tractor projecting centrally into the operating area, and a framework mounted on the tractor comprising a form upstanding at each side of the operating area, an upwardly curved yoke bridging and connecting the forms, the highest part of the yoke being above the plane of the steering member, and an operating area protective covering comprising side sections mounted on said forms and a cowl section extending over said yoke, the cowl section having curved rear edges meeting the side sections at points spaced rearwardly of the yoke thereby providing rearwardly extending curved portions of the protective covering laterally spaced relative to the steering member.

13. An enclosure for a tractor having an engine mounted in the forward portion thereof, an operating area for the operator of the tractor positioned rearwardly of the engine, and a framework removably mounted on the tractor, said framework comprising a pair of forms each of generally rectangular shape, one of which projects upwardly at one side of the operating area and the other of which projects upwardly at the opposite side of the operating area, one of said forms extending along each side of the operating area from substantially the rear thereof toward but spaced from the engine, means projecting downwardly from each form for mounting the forms on a tractor, an upwardly curved yoke extending between and connecting the forms, and an operating area protective covering mounted on said forms and extending over said yoke, providing side protection for the operating area and providing a covering for the space between the forward portions of the forms and the engine.

14. An enclosure for a tractor having an engine mounted in the forward portion thereof, an operating area for the operator of the tractor positioned rearwardly of the engine, a tractor steering member projecting into the operating area and a framework removably mounted on the tractor, said framework comprising a pair of forms each of generally rectangular shape, one of which projects upwardly at one side of the operating area and the other of which projects upwardly at the opposite side of the operating area, one of said forms extending along each side of the operating area from substantially the rear thereof forwardly of the steering member, means projecting downwardly from each form for mounting the forms on a tractor, and an operating area protective covering mounted on said forms for protecting the operating area against side winds.

LEE FLORA.

REFERENCES CITED

The following references are of record in the file of this patent:

UNITED STATES PATENTS

| Number | Name | Date |
|---|---|---|
| 1,443,631 | Meadows | Jan. 30, 1923 |
| 1,465,712 | Hanson | Aug. 21, 1923 |
| 1,546,486 | Gerber | July 21, 1925 |
| 1,988,975 | Weiland | Jan. 22, 1935 |
| 2,052,471 | Hula | Aug. 25, 1936 |
| 2,256,890 | Brown et al. | Sept. 23, 1941 |

FOREIGN PATENTS

| Number | Country | Date |
|---|---|---|
| 8,337 | Great Britain | Apr. 19, 1905 |
| 112,135 | Switzerland | Oct. 1, 1925 |
| 435,924 | France | Mar. 13, 1912 |
| 509,764 | Great Britain | Jan. 17, 1938 |